(12) United States Patent
Kuchimaru

(10) Patent No.: US 7,224,542 B2
(45) Date of Patent: May 29, 2007

(54) LENS AND LENS UNIT

(75) Inventor: Toru Kuchimaru, Toyokawa (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 0 days.

(21) Appl. No.: 10/977,714

(22) Filed: Oct. 29, 2004

(65) Prior Publication Data
US 2005/0264898 A1 Dec. 1, 2005

(30) Foreign Application Priority Data
May 25, 2004 (JP) ............................. 2004-154149

(51) Int. Cl.
*G02B 7/02* (2006.01)
(52) U.S. Cl. .................... 359/811; 359/808; 359/819
(58) Field of Classification Search ............... 359/703, 359/811, 819, 808, 821
See application file for complete search history.

(56) References Cited

U.S. PATENT DOCUMENTS 6,452,731 B1 * 9/2002 Schorning ............... 359/742
6,717,754 B2 * 4/2004 Hirunuma et al. .......... 359/819
2001/0019459 A1 * 9/2001 Denpo ...................... 359/808

FOREIGN PATENT DOCUMENTS

| JP | 60-213916 A | 10/1985 |
| JP | 8-313781 A | 11/1996 |
| JP | 2002-90606 A | 3/2002 |
| JP | 2004-246258 | * 9/2004 |

* cited by examiner

*Primary Examiner*—Timothy Thompson
*Assistant Examiner*—Jerry Fang
(74) *Attorney, Agent, or Firm*—Sidley Austin LLP

(57) ABSTRACT

Provided are a lens and a lens unit, whereby even in the case of a small-diameter lens, manufacturing can easily be performed, and a sufficient strength of adhesion to a lens holder can be obtained. The lens includes an effective portion; a peripheral edge portion provided around a periphery of the effective portion, wherein at least one of a front and a rear faces is a planar face intersecting an axial direction; and a rib portion that is provided around a periphery of the peripheral edge portion, that has a front and a rear faces wherein one of the front and the rear faces is a planar face intersecting the axial direction, and that has a thickness reduced to be thinner toward an outer side. The lens unit of the present invention is configured such that the lens is arranged at an end of a lens system, and the lens system is together assembled into a lens holder.

4 Claims, 4 Drawing Sheets

LENS AND LENS UNIT

This application is based on Application No. 2004-154149 filed in Japan, contents of which is hereby incorporated by reference.

BACKGROUND OF THE INVENTION

1. Field of the Invention

The present invention relates to a lens and a lens unit for use with a camera or the like, the lens unit being formed by combining a plurality of lenses in an optical-axial direction. More particularly, the invention relates to a lens and a lens unit in which a peripheral edge portion of the lens is bonded and thereby fixed to a lens holder.

2. Description of Related Art

Conventionally, in case of a lens such as a resin optical lens, the lens is bonded with an adhesive to a lens holder and thereby to fixed to the holder. Particularly, in an apparatus used in various environments, the lens is required to be securely bonded. To securely bond a lens to a lens holder, techniques have been developed in which a projecting portion is provided on the periphery of the lens and an adhesive is coated in such a manner as to cover the projecting portion (such techniques are disclosed in Japanese Unexamined Patent Application Publication No. 8-313781, for example).

In this connection, there have also existed lens units formed of multiple optical lenses bonded and fixed to a lens holder at predetermined positions and in predetermined arrangement. By way of general practice, when assembling such a lens unit, a lens to be arranged at an end of the lens unit should be press-held to the lens holder before the adhesive is partially hardened. This makes it difficult to cover the projecting portions with the adhesive in the above-described technique. As such, as is shown in FIG. 5, the arrangement is made such that a peripheral edge portion of an each individual lens is formed extending to the outer circumferential direction so as to be commonly used as a bonding portion and a pressed portion.

Nevertheless, however, a lens unit of the above-described conventional type reduced in diameter has a problem in that a fitting-portion diameter is proportionally reduced and hence the bonding area is proportionally reduced. This leads to potentially insufficiency of adhesion strength. Particularly, for recent mobile apparatuses, requirement for impact resistance is strict, so that further enhancement is demanded in regard to the adhesion strength.

SUMMARY OF THE INVENTION

The present invention is made to solve the problems with conventional lenses and lens units as described above. An object of the present invention is, therefore, to provide at least a lens and a lens unit wherein while lenses are small in diameter, manufacturing can easily be performed, and sufficient strengths of adhesion to a lens holder can be obtained.

A lens of the present invention, which is provided to solve the problems, comprises an effective portion; a peripheral edge portion provided around a periphery of the effective portion, wherein at least one of a front and a rear faces is a planar face intersecting an axial direction; and a rib portion that is provided around a periphery of the peripheral edge portion, that has a front and a rear faces wherein one of the front and the rear faces is a planar face intersecting the axial direction, and that has a thickness reduced to be thinner toward an outer side.

According to the lens of the present invention, the rib portion is provided around the periphery of the peripheral edge portion. As such, when the lens is bonded by being inserted into a lens holder, the arrangement can be made such that an adhesive applied into a space between the peripheral edge portion and the lens holder comes in contact with the rib portion also. Accordingly, the boding area of the adhesive is enlarged, and the adhesion strength is strong. Further, the rib portion becomes thinner toward the outer side, a metal-die drafting resistance can be reduced whereby enable to perform steady molding. Consequently, even in the case of a small-diameter lens, manufacturing can easily be performed, so that the lens is produced to be able to obtain a sufficient strength of adhesion to the lens holder.

Further, a lens unit of the present invention is formed such that a lens system formed of at least two lenses is assembled into a lens holder. A lens positioned at least at one end comprises an effective portion; a peripheral edge portion provided around a periphery of the effective portion, wherein a face facing an inner side of the lens system is a planar face intersecting an axial direction; and a rib portion that is provided around a periphery of the peripheral edge portion, that has a face facing an outer side of the lens system as being a planar face intersecting the axial direction, and that has a thickness reduced to be thinner toward an outer side. An outer side face parallel with the axial direction is provided around the periphery of the peripheral edge portion; and the rib portion has a maximum thickness less than a thickness of the peripheral edge portion, and is positioned closer to an outer side of the lens system than the outer side face.

According to the lens unit of the present invention, the lens positioned at least one end has the features of the lens described above. Accordingly, even in the case of a lens unit using small-diameter lenses, manufacturing can easily be performed. Concurrently, since a sufficient strength of adhesion to the lens holder, the lens unit has a high strength.

The above and further objects and novel features of the invention will more fully appear from the following detailed description when the same is read in connection with the accompanying drawing. It is to be expressly understood, however, that the drawings are for the purpose of illustration only and are not intended as a definition of the limits of the invention.

BRIEF DESCRIPTION OF DRAWINGS

For a better understanding of the present invention, reference is made to the following description of the invention, just in conjunction with the accompanying drawings in which.

DETAILED DESCRIPTION OF PREFERRED EMBODIMENTS

With reference to the accompanying drawings, the following will describe a best embodiment formed by particularizing the present invention. The present embodiment represents an example formed by adapting the present invention to a small-diameter lens unit used in a mobile apparatus or the like.

Figure 1:
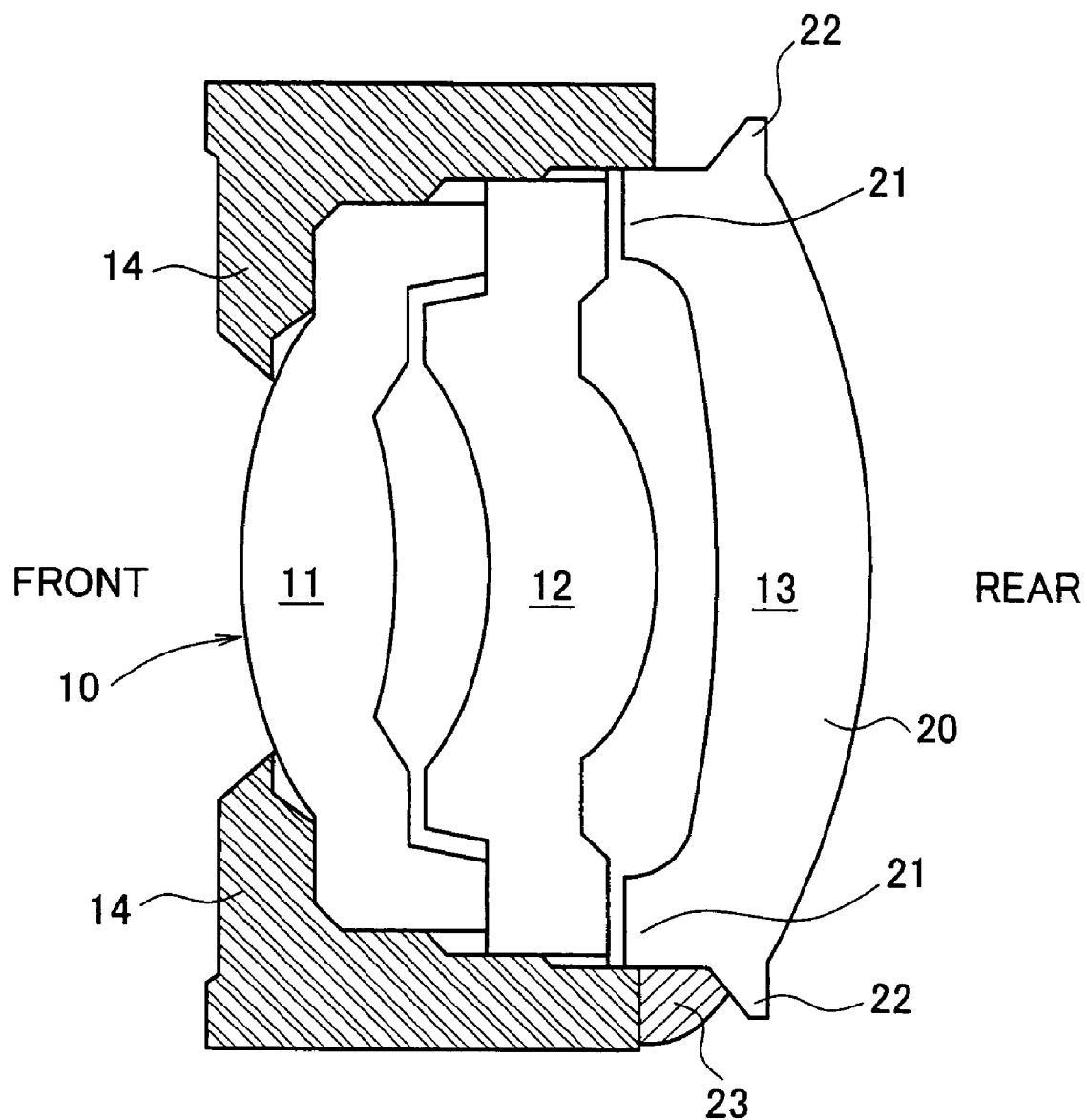
FIG. 1 is a cross-sectional view schematically showing the shape of a lens unit of the present invention.

With reference to FIG. 1, a lens unit 10 according to this embodiment is formed such that three lenses 11 to 13 are fixed by being bonded to a lens holder 14 having a substantially cylindrical shape. In FIG. 1, the left side of the lens unit is facing to an image-subject object, and the right side is the image capture side. Hereafter, the object side is referred to as "front," and the image capture side is referred to as "rear."

The lens 11 is located front-most of the lenses 11 to 13. Front and side faces of the lens 11 are in contact with the lens holder 14. A rear face of the peripheral edge portion of the lens 11 and a front face of a peripheral edge portion of the lens 12 are in contact with each other, and a clearance between them is maintained appropriately. In FIG. 1, there is a clearance between peripheral edge portions of the lens 12 and 13. Generally, another member such as a shield is inserted in the clearance. In the lens unit 10, in the lens 13 located rear-most, an a peripheral edge portion 21 is provided around a periphery of an effective portion 20, and a rib portion 22 is further provided around an outer periphery of the peripheral edge portion 21. In addition, adhesive 23 is applied to the spaces between the peripheral edge portion 21 of the lens 13 and the lens holder 14 and between the rib portion 22 of the lens 13 and the lens holder 14.

Figure 2:
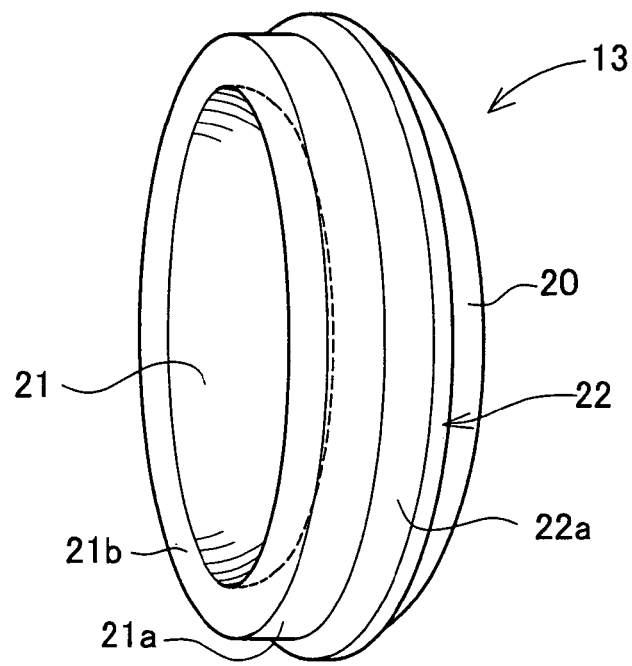
FIG. 2 is a perspective view schematically showing the shape of a front side of a lens.
Figure 3:
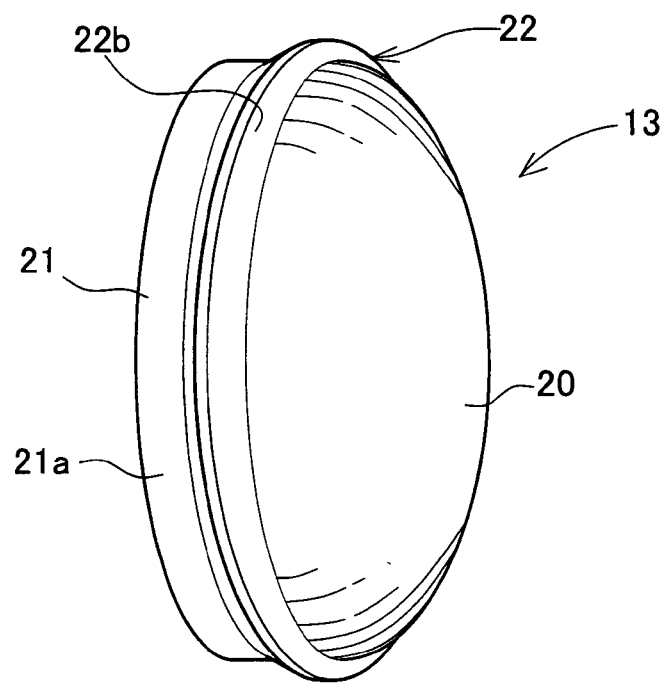
FIG. 3 is a perspective view schematically showing a rear side of the lens.

The shape of the lens 13 will be described hereunder. As shown in FIGS. 2 and 3, the lens 13 has the effective portion 20 in the center, the peripheral edge portion 21 having a substantially cylindrical shape, and the rib portion 22 shaped as a ring projection in the outer peripheral direction from the peripheral edge portion 21. FIG. 2 is a perspective view of the lens 13 as viewed from the front side thereof. FIG. 3 is a perspective view of the lens 13 as viewed from the rear side thereof. The effective portion 20 is a portion of the lens 13 in a range through which effective optics passes. The peripheral edge portion 21 is a portion used to mount the lens 13 to the lens holder 14, and is formed with a substantially uniform width along the entire periphery of the effective portion 20.

As shown in FIGS. 2 and 3, in the lens 13, an outer face 21a of the peripheral edge portion 21 is a cylindrical face extending in parallel with the axial direction of the lens 13. A front face 21b of the peripheral edge portion 21 is a planar face perpendicular to the axial direction. The rib portion 22 is disposed closer to the rear side than the peripheral edge portion 21. In more specific, the rib portion 22 is positioned on the side opposite the front face 21b via the outer face 21a being sandwiched. A front face 22a of the rib portion 22 is a conical face rearwardly tapered toward the outer periphery. That is, the front face 22a is a sloped face being spaced away from the front face 21b of the peripheral edge portion 21 toward the outer side. A rear face 22b on the reverse side of the front face 22a of the rib portion 22 is a planar face perpendicular to the axial direction. The rib portion 22 is formed to have a thickness reduced to be thinner toward the outer side. The rear face 22b of the rib portion 22 is a face on the side opposite the front face 21b of the peripheral edge portion 21. In addition, as shown in FIG. 1, the maximum thickness of the rib portion 22 is less than the thickness, i.e., the axial length, of the peripheral edge portion 21.

In manufacture of the lens unit 10, the lenses 11 and 12 are first fitted to the lens holder 14. Then, the lens 13 is inserted into the lens holder 14. Of portions of the lens 13, the outer face 21a is in contact with the lens holder 14. More specifically, of portions of the peripheral edge portion 21, the portion other than the rib portion 22 comes in contact with the lens holder 14. Additionally, the front face 21b of the peripheral edge portion 21 faces the rear face of the peripheral edge portion of the lens 12. Then, as is shown FIG. 4, an adhesive nozzle 24 is brought close to a portion between the rear face of the lens holder 14 and the rib portion 22 whereby to apply the adhesive 23 to the portion. Thereby, the adhesive 23 is stuck to the rear face of the lens holder 14, to the outer face 21a of the peripheral edge portion 21, and to the front face 22a of the rib portion 22, and comes into deposited states on the faces. Thus, in comparison to the case of a conventional lens 101, the boding area of the adhesive 23 is increased by the provision of the rib portion 22. Accordingly, the adhesion strength of the lens 13 is increased.

As described above, the front face 22a of the rib portion 22 is a conical face. As such, the space between the front face 22a and the rear face of the lens holder 14 is formed to be larger toward the outer periphery. Accordingly, the tip of the adhesive nozzle 24 can easily be inserted into the space therebetween; thereby a predetermined amount of the adhesive 23 is applied to a predetermined place easily. In this case, the adhesive 23 need not be applied over the entire periphery, but may be applied to appropriate bonding portions.

Figure 4:
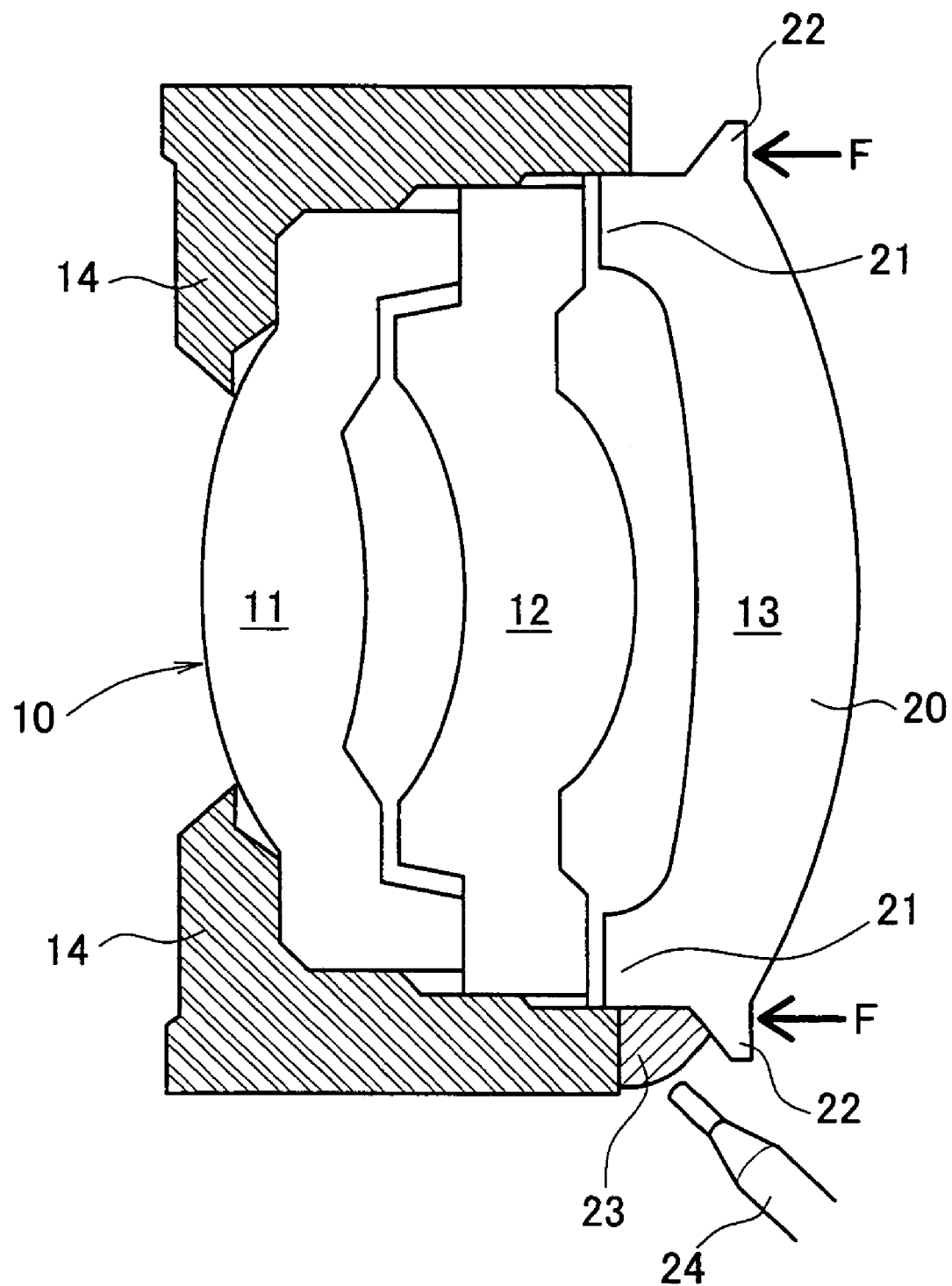
FIG. 4 is a view (explanatory view) depicting a lens unit in a stage of manufacture.
Figure 5:
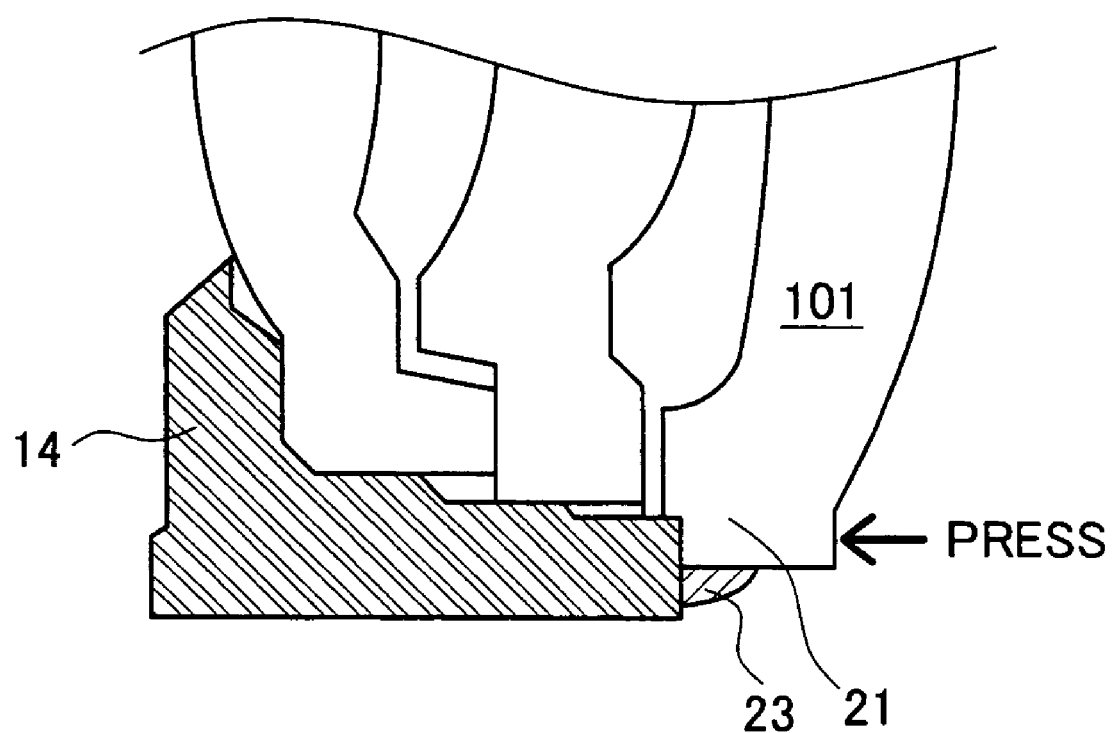
FIG. 5 is a cross-sectional view schematically showing the shape of a conventional lens unit.

In addition, as shown in FIG. 4, a forward pressure force F is exerted on the rear face 22b of the rib portion 22 of the lens 13 to prevent misalignment of bonding portions before the applied adhesive 23 is partially hardened. As described above, the lens 11 and the lens 12 are arranged in contact with each other at the peripheral edge portions, and the lens 12 and the lens 13 are arranged adjacent each other with an other member interposed between the peripheral edge portions. In this arrangement, when the rib portion 22 of the lens 13 is pressed to the front side, the peripheral edge portion of the lens 11 is pressed to the lens holder 14 via the peripheral edge portion of the lens 12. In this case, since the rear face 22b of the rib portion 22 is perpendicular to the axial direction, the pressure force F may be a force perpendicular to the rear face 22b. This arrangement avoids an event wherein an oblique force is exerted on the lens 13, consequently preventing undesired events, such as distortion of the lenses 11 to 13 and misalignments of the bonding portions.

As a result of the above, as shown in FIG. 1, the lens 13 is fixed such that the outer face 21a of the peripheral edge portion 21 is bonded to the lens holder 14 in the portion closer to the front side than the rib portion 22. That is, the fitting-portion diameters of the lens holder 14 and the lens 13 are not enlarged by the presence of the rib portion 22. In addition, in the lens unit 10, the adhesive 23 is deposited between the front face 22a of the rib portion 22 and the rear face of the lens holder 14. Thereby, the boding area of the adhesive 23 is enlarged, thereby assuring secured bonding and fixing between the lens holder 14 and the lens 13.

Further, the rib portion 22 of the lens 13 is shaped to have the thickness reduced to be thinner toward the outer periphery. Thereby, compared to the case of the conventional lens 101, a metal-die drafting resistance is lower, so that the lens 13 is superior in molding stability.

As described above, in the lens unit 10, the rib portion 22 is provided around the outer periphery of the peripheral edge portion 21 of the lens 13 which is at the rear end of lenses. Accordingly, the adhesive 23 is deposited on the rear side of the lens holder 14, on the outer face 21a of the peripheral edge portion 21, and on the front face 22a of the rib portion 22, whereby the boding area is increased and, concurrently, the adhesion strength is increased. Further, the front face 22a of the rib portion 22 is formed as a sloped conical face expanding toward the rear side. Accordingly, the adhesive nozzle 24 can easily be inserted into the space between the lens holder 14 and the rib portion 22, and the slope angle of the front face 22a is suitable as a metal-die draft angle also. As such, even with small-diameter lenses, manufacturing can easily be performed to produce the lens 13 and the lens unit 10 for which sufficient adhesion strengths can be obtained.

The present invention is not restricted to the above-described embodiments but needless to say, may be improved or modified in various ways within a scope not departing from the gist of the present invention. For example, in the lens 13 according to the present embodiment, although the rib portion 22 is provided around the entire periphery of the peripheral edge portion 21, the rib portion 22 need not necessarily be provided around the entire periphery. Inasmuch as appropriate bonding portions and press portions can be concurrently secured, the rib portion 22 may be arbitrarily provided. In addition, the rib portion 22 is provided to the rear-most lens 13 in the lens unit 10 according to the present embodiment. However, depending on the shape of the lens holder 14, the technique may be applied to a front-most lens. Further, for example, the number of lenses to be assembled into the lens unit 10 and the shapes and locations of the individual lenses 11 to 13, the lens holder 14, and the like in the above-described embodiment have been described and shown only as examples, and hence the present invention is not limited thereby.

According to the techniques of the lens and the lens unit of the present invention, even with small-diameter lenses, manufacturing can easily be performed, and a sufficient strength of adhesion to the lens holder can be obtained.

What is claimed is:

1. A lens unit formed such that a lens system formed of at least two lenses is assembled into a lens holder, wherein a lens positioned at least at one end comprises:
    an effective portion;
    a peripheral edge portion provided around a periphery of the effective portion, wherein a face facing an inner side of the lens system is a planar face intersecting an axial direction; and
    a rib portion that is provided around a periphery of the peripheral edge portion, that has a face facing an outer side of the lens system as being a planar face intersecting the axial direction, and that has a thickness reduced to be thinner toward an outer side, wherein:
    an outer side face parallel with the axial direction is provided around the periphery of the peripheral edge portion;
    the rib portion has a maximum thickness less than a thickness of the peripheral edge portion, has a face facing an inner side of the lens system which slopes toward a periphery of the lens system in an outer side direction, and is positioned closer to an outer side of the lens system than the outer side face; and
    adhesive adheres to the lens holder, the outer side face of the peripheral edge portion, and a face facing an inner side of the lens system of the rib portion.

2. A lens unit according to claim 1,
    wherein the planar face of the rib portion is opposite the planar face of the peripheral edge portion.

3. A lens unit according to claim 1,
    wherein a reverse side of the planar face of the rib portion is said face facing an inner side of the lens system and which is spaced away from the planar face of the peripheral edge portion toward an outer side.

4. A lens unit having at least two lenses assembled into a lens holder, wherein a lens positioned at least at one end of said lens holder comprises:
    an effective portion;
    a peripheral edge portion; and
    a rib portion;
    wherein said peripheral edge portion is provided at a periphery of the effective portion, said peripheral edge portion having a face which is planar and intersects an axial direction and faces inwardly into the lens unit, and said peripheral edge portion having an outer side face which is parallel with the axial direction and faces outwardly from an axis of the lens unit;
    wherein said rib portion is provided at a periphery of the peripheral edge portion, said rib portion having a face which is planar and intersects an axial direction and faces outwardly from the lens unit, said rib portion having a thickness that is reduced to be thinner toward an outer edge, said rib portion having a conical face on its inner side which is rearwardly tapered toward the outer periphery; and
    wherein the outer side face of the peripheral edge portion and the face on the inner side of the rib portion are adhered to the lens holder with adhesive.

* * * * *